A. Graham,
Wrench.

Nº 13,388.  Patented Aug. 7, 1855.

N. PETERS, PHOTO-LITHOGRAPHER, WASHINGTON, D. C.

UNITED STATES PATENT OFFICE.

ALDEN GRAHAM, OF ROXBURY, MASSACHUSETTS.

WRENCH.

Specification of Letters Patent No. 13,388, dated August 7, 1855.

*To all whom it may concern:*

Be it known that I, ALDEN GRAHAM, of Roxbury, in the county of Norfolk and State of Massachusetts, have invented a new and Improved Ratchet-Wrench; and I do hereby declare that the following is a full, clear, and exact description of the same, reference being had to the annexed drawings, making a part of this specification, in which—

Figure 1:
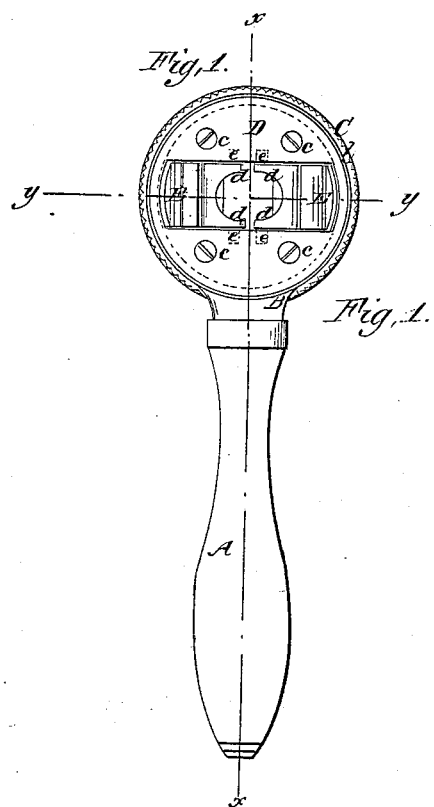
Figure 2:
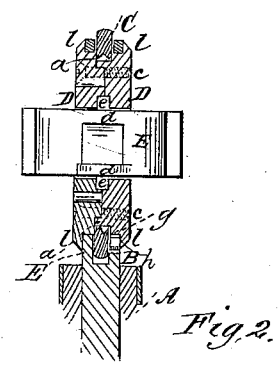
Figure 4:
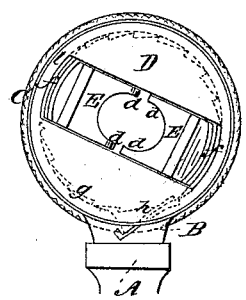
Figure 3:
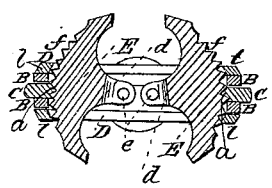

Figure 1, is an external or side view of my improvement. Fig. 2, is a section of ditto, (*x*) (*x*) Fig. 1, showing the plane of section. Fig. 3, is also a section of ditto, (*y*) (*y*) Fig. 1, showing the plane of section. Fig. 4, is an external or side view of ditto, this side being opposite to the side shown in Fig. 1.

Similar letters of reference indicate corresponding parts in the several figures.

The nature of my invention consists in operating two jaws which work or turn on pivots in circular plates, by means of a ring or band which has a screw thread cut on its inner periphery or edge, the ring or band encompassing said plates and the screw thread working between threads cut on the outer sides of the jaws.

A, represents the handle of the implement, constructed of either wood or metal, and B, B, are two annular clamps which are secured to the end of the handle a space being allowed between them to receive a ring C, which has a screw thread (*a*) cut in its inner edge or periphery as clearly shown in Figs. 2 and 3.

D, D, are two circular plates which are fitted within the clamps B, B. These plates are each provided with a flanch or projection (*l*) which fits on or over the outer sides of the clamps, the two plates being secured together within the clamps by screws (*c*). The inner surfaces of the plates D, D, are in contact and a slot or opening is made through the centers of the two plates in which two jaws E, E, are fitted transversely with the plates. The jaws have each projections (*d*) on their inner surfaces to which pins (*e*) are attached, and these pins fit in recesses or holes in the plates D, D, as shown in Figs. 2 and 3, and by dotted lines in Fig. 1. The jaws E, E, work or turn on the pins (*e*), and the ends of the jaws project outward at equal distances at each side of the plates as shown in Figs. 2 and 3. The outer sides of the jaws E, E, have screw threads (*f*) cut in them, as clearly shown in Fig. 3, the "pitch" of the threads (*f*) of course corresponding to the screw thread (*a*) on the inner edge or periphery of the ring C. The screw thread (*a*) of the ring C, works between the threads (*f*) of the jaws E, E. One of the plates D, has ratchet teeth (*g*) cut in its edge and a pawl or spring (*h*) is attached to the inner edge of one of the clamps, said pawl or spring catching into the teeth (*g*), see dotted lines in Fig. 4.

The way in which the implement is used will be readily seen. By turning the ring C, the jaws are operated, either end of the jaws being made to grasp the nut or other article to be turned, and the handle A, may be moved in one direction without turning the plates D, and jaws E, as the pawl or spring (*h*) will slip over the teeth (*g*) on the plate D, but, when the handle is moved in the opposite direction the pawl or spring (*h*) will catch against the teeth (*g*) and cause the plates D, and jaws E, to turn with the handle. Thus a nut may be screwed up or any article turned without taking the wrench from it at every stroke or movement of the handle.

The jaws E, E, by being operated as shown may be firmly secured to the article to be turned, and the implement is well adapted for large work, or where considerable power is required as it can be made very strong and durable, much more so than the ordinary screw or other adjustable wrenches.

I do not claim the arrangement of a plate provided with ratchet teeth in which a pawl catches, so as to allow the implement to be operated without removing it from the nut or other article to be turned as ratchet wrenches have been previously used, but,

What I claim as new and desire to secure by Letters Patent, is—

Fitting the jaws E, when turning on pivots in the slot, and operating the same by a ring C, having a screw thread (*a*) on its inner surface to work between threads (*f*) cut on the outer surface of the jaws, in the manner and for the purpose set forth.

ALDEN GRAHAM.

Witnesses:
ELLIOT E. KELLOGG,
WM. GASTON.